(12) United States Patent
Hatfield

(10) Patent No.: US 11,512,787 B2
(45) Date of Patent: Nov. 29, 2022

(54) VALVE FOR INFLATING AND DEFLATING AN INFLATABLE ELEMENT

(71) Applicant: Monty James Hatfield, Ås (NO)

(72) Inventor: Monty James Hatfield, Ås (NO)

( * ) Notice: Subject to any disclaimer, the term of this patent is extended or adjusted under 35 U.S.C. 154(b) by 0 days.

(21) Appl. No.: 17/421,982

(22) PCT Filed: Jan. 14, 2020

(86) PCT No.: PCT/NO2020/050003
§ 371 (c)(1),
(2) Date: Jul. 9, 2021

(87) PCT Pub. No.: WO2020/149745
PCT Pub. Date: Jul. 23, 2020

(65) Prior Publication Data
US 2022/0112960 A1   Apr. 14, 2022

(30) Foreign Application Priority Data

Jan. 14, 2019   (NO) .................................. 20190043

(51) Int. Cl.
| *F16K 15/20* | (2006.01) |
| *F16K 15/16* | (2006.01) |
| *F16K 15/18* | (2006.01) |

(52) U.S. Cl.
CPC ............ *F16K 15/202* (2013.01); *F16K 15/16* (2013.01); *F16K 15/1825* (2021.08); *F16K 15/20* (2013.01)

(58) Field of Classification Search
CPC ...... F16K 15/16; F16K 15/1825; F16K 15/20; F16K 15/202
See application file for complete search history.

(56) References Cited

U.S. PATENT DOCUMENTS

| 2,942,614 A | 6/1960 | Edward |
| 4,004,614 A | 1/1977 | Mackal et al. |
| 5,343,889 A * | 9/1994 | Jaw ........................ F16K 15/205 137/232 |
| 6,648,004 B2 * | 11/2003 | Lau ........................ F16K 15/148 137/232 |

(Continued)

OTHER PUBLICATIONS

International Search Report, Application PCT/NO2020/050003, dated Apr. 30, 2020, 5 pages.

(Continued)

*Primary Examiner* — Kevin F Murphy
(74) *Attorney, Agent, or Firm* — Vorys, Sater, Seymour and Pease LLP; Khaled Shami

(57) ABSTRACT

A valve for inflating and deflating an inflatable element includes a valve housing fluid connected to the inflatable element, an at least one hole extending through the valve housing and accommodated to let a fluid flow in and out the valve housing for inflating and deflating the inflatable element, and a flap disposed next to the at least one hole inside the valve housing, such that the flap covers the at least one hole and behaves as a flap when inflating the inflatable element. The flap is inflatable and is fluid connected with a nozzle disposed outside the valve housing. The inflatable flap, when inflated, uncovers the at least one hole releasing a fluid flow through the at least one hole for deflating the inflatable element.

8 Claims, 3 Drawing Sheets

(56) References Cited

U.S. PATENT DOCUMENTS

| | | | |
|---|---|---|---|
| 7,273,065 B1* | 9/2007 | Robbins | F16K 15/205 |
| | | | 137/228 |
| 9,395,007 B2* | 7/2016 | Frayne | F16K 15/147 |
| 2005/0218367 A1 | 10/2005 | Shinner | |
| 2007/0163652 A1 | 7/2007 | Pekar et al. | |
| 2013/0074274 A1 | 3/2013 | Chaffee | |
| 2014/0209184 A1 | 7/2014 | Frayne | |
| 2017/0370487 A1 | 12/2017 | Maxfield et al. | |

OTHER PUBLICATIONS

Norwegian Search Report, Patent Application No. 20190043, dated Aug. 12, 2019, 2 pages.

* cited by examiner

VALVE FOR INFLATING AND DEFLATING AN INFLATABLE ELEMENT

BACKGROUND OF THE INVENTION

Field of the Invention

The invention relates to valves in general and more specifically to a valve for inflating and deflating an inflatable element.

Background Art

State of the art is reflected in one-way valves used for manually inflating and deflating an inflatable element, for example an inflatable mattress. Such one-way valves are designed to allow a gas to flow one-way through the valve. They comprise a clapper or flap mounted inside the valve body. The gas is introduced by a user into the inflatable element, for example by blowing air directly into the one-way valve. The degree of opening on the one-way valve's clapper is determined by the flow rate of the fluid. The higher the flow rate, the more open the valve will be, letting the gas into the inflatable element and ultimately inflating the inflatable element to a desired state.

The problem with such valve is that they are usually made of soft or hard material or a combination of both, and comprise solid and stiff elements. They may also require a user to perform a precise hand manipulation when operating the one-way valve, this may be impractical for example in cold weather conditions when the user needs to keep gloves on to stay warm. Further, they can also include loose elements, for example to close or open the valve, making it even less practical to manipulate the valve.

There is therefore a need for an improved valve to overcome the above mentioned problems.

SUMMARY OF THE INVENTION

Problems to be Solved by the Invention

A main object of the present invention is to provide a valve that simplifies the inflation and deflation of an inflatable element.

Another object of the present invention is to provide a valve with a simpler design than was traditionally used in prior art.

Another object of the present invention is to provide a valve that allows a user to inflate and deflate an inflatable element without a precise hand manipulation of the valve.

Another object of the present invention is to provide a valve that is not comprised of rigid or stiff elements.

Another object of the present invention is to provide a valve that does not comprise loose elements.

Another object of the present invention is to provide a valve that is simple and low-cost to manufacture.

Means for Solving the Problems

The objectives are achieved according to the invention by a valve as defined in the preamble of claim 1, having the features of the characterising portion of claim 1 and an inflatable element comprising the valve as defined in the preamble of claim 6, having the features of the characterizing portion of claim 6.

A number of non-exhaustive embodiments, variants or alternatives of the invention are defined by the dependent claims.

The claimed system attains the above-described objective by a valve comprising an inflatable flap that is both a flap and can be inflated.

In a first aspect of the invention a valve is provided for inflating and deflating an inflatable element wherein the valve comprises: a valve housing fluid connected to the inflatable element; an at least one hole extending through the valve housing and accommodated to let a fluid flow in and out of the valve housing for inflating and deflating the inflatable element; and a flap disposed next to the at least one hole inside the valve housing, such that the flap covers the at least one hole and behaves as a flap when inflating the inflatable element. Wherein the flap is inflatable and is fluid connected with a nozzle disposed outside the valve housing. Wherein the inflatable flap, when inflated, uncovers the at least one hole releasing a fluid flow through the at least one hole for deflating the inflatable element.

In one embodiment, the inflatable flap is comprised by a valve inflatable part together with the nozzle in a unitary body.

In one embodiment, the inflatable flap is made of fluid tight and moisture resistant material.

In one embodiment, the nozzle is provided with means for closing the nozzle.

In one embodiment, the valve housing and the inflatable flap are provided with means for minimizing fluid leakages.

In a second aspect of the invention, an inflatable element is provided comprising a valve according to the first aspect of the invention and embodiments given above, wherein the valve comprises: a valve housing fluid connected to the inflatable element; an at least one hole extending through the valve housing and accommodated to let a fluid flow in and out the valve housing for inflating and deflating the inflatable element; a flap disposed next to the at least one hole inside the valve housing, such that the flap covers the at least one hole and behaves as a flap when inflating the inflatable element. Wherein the flap is inflatable and is fluid connected with a nozzle disposed outside the valve housing. Wherein the inflatable flap, when inflated, uncovers the at least one hole releasing a fluid flow through the at least one hole for deflating the inflatable element.

In one embodiment, the inflatable element further comprises a plurality of inflatable elements each comprising a valve.

In one embodiment, the inflatable flap of each valve, comprised in the plurality of inflatable elements, are fluid connected to accommodate a simultaneous deflation of the plurality of inflatable elements.

In one embodiment, the at least one hole of each valve, comprised in the plurality of inflatable elements, are fluid connected to accommodate a simultaneous inflation of the plurality of inflatable elements.

Effects of the Invention

The present invention comprises a technological advantage over prior art in that it combines the use of a at least one hole extending through a valve housing, and a valve inflatable part having a nozzle and an inflatable flap. The inflatable flap is deflated when the inflatable element is being inflated and closes the at least one hole of the valve when the inflatable element is inflated to a desired state due to pressure inside the valve housing. A distinguishing feature of the present invention is that the inflatable flap can be inflated to open the at least one hole of the valve to deflate the inflatable element. When inflated the valve inflatable flap is no longer flat, its surface is curved and stiff, and uncovers the at least one hole allowing a gas flow to be released through the at least one hole. Another distinguishing feature is that the inflatable flap is comprised by a valve inflatable part together with the nozzle in a unitary body, which make it easy to produce.

The combine use of the at least one hole and valve inflatable part allows to control the gas flow through the at least one hole without a precise hand manipulation of the valve.

The present invention provides several further advantageous effects:

- It makes it possible to safely and optimally fold and unfold an inflatable element. This is made possible as the valve of the present invention can be made of flexible material that can be easily folded or unfolded, further making it possible for an inflatable element equipped with the valve to be folded to an optimal volume. Furthermore, the risk of punctuation of the air chamber is reduced since the present invention preferably does not comprise any solid or stiff elements.
- It makes it possible for a user to inflate and deflate an inflatable element without having to perform a precise hand manipulation of the valve. This is made possible since the valve of the present invention preferably does not require to manually open or close an element of the valve in order to operate it, and the valve preferably does not comprise any loose elements. Hence, a user can hold coarsely the inflatable element and at the same time blow air directly into the holes at the surface thereby inflating the inflatable element. Once the inflatable element is inflated, the user can stop blowing air. This triggers the valve inflatable flap to retract onto the at least one hole of the valve due to pressure inside the inflatable element, such that it closes the at least one hole. Therefore, it prevents air from inside the inflatable element to be released, and retains the inflatable element inflated. Alternatively, the user can hold coarsely the inflatable element and blow air into the nozzle to inflate the valve inflatable flap. The valve inflatable flap consequently curves and uncovers the at least one hole of the valve opening a passageway for air from the inflatable element to be released, ultimately deflating the inflatable element.
- it makes it possible to achieve a simpler valve design than traditionally used in prior art, making the valve of the present invention easy and cost effective to produce, simple to implement and simple to operate.
- It makes it possible to inflate at the same time a multitude of separated air chamber equipped with the valve.
- It makes it possible to deflate at the same time a multitude of separated air chamber equipped with the valve.

BRIEF DESCRIPTION OF THE DRAWINGS

The above and further features of the invention are set forth with particularity in the appended claims and together with advantages thereof will become clearer from consideration of the following detailed description of exemplary embodiments of the invention given with reference to the accompanying drawings.

The invention will be further described below in connection with exemplary embodiments which are schematically shown in the drawings, wherein.

DESCRIPTION OF THE REFERENCE SIGNS

Figure 1:
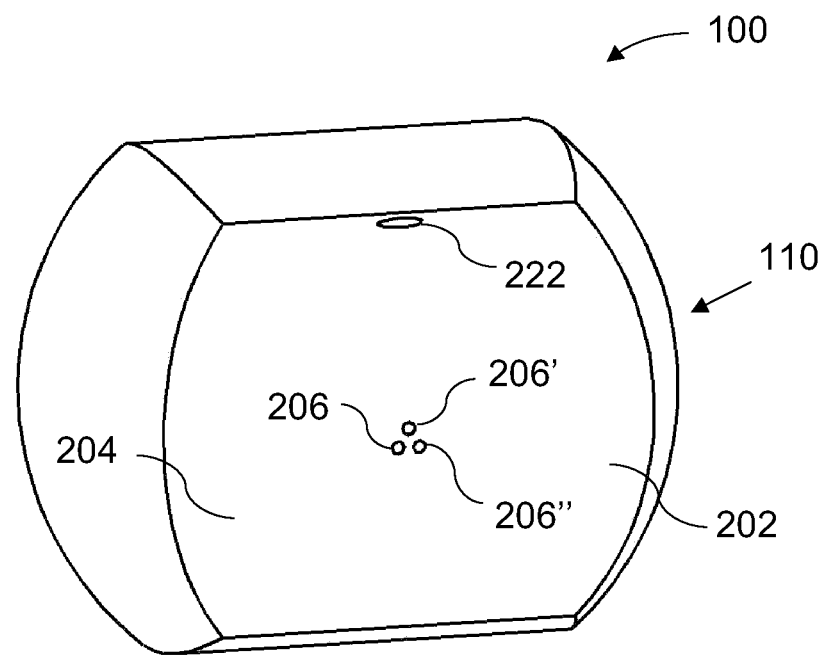
FIG. 1 shows a schematic view of a system for inflating and deflating an inflatable element comprising a valve according to one embodiment of the present invention

The following reference numbers and signs refer to the drawings:

| | |
|---|---|
| 100 | System according to one embodiment of the present invention |
| 110 | Inflatable element |
| 200 | Valve |
| 202 | Valve housing |
| 204 | Valve housing surface |
| 206, 206', 206" | At least one valve hole |
| 220 | Valve inflatable part |
| 222 | Nozzle - of the valve inflatable part |
| 224 | Inflatable flap - of the valve inflatable part |
| 300 | First pipe - connecting a plurality of at least one hole 206 |
| 301 | Main opening - for inflating a plurality of inflatable elements 110 |
| 302 | Second pipe - connecting a plurality of nozzle 222 |
| 303 | Main nozzle - for inflating a plurality of inflatable flaps 224 |

DETAILED DESCRIPTION OF THE INVENTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The following definitions will be used:

Inflatable Element:

An inflatable element is an object that can be inflated with a gas, usually with air, but other gases such as hydrogen, helium and nitrogen or other type of gases can also be used. One advantage of an inflatable is that it can be stored in a small space when not inflated, since inflatables depend on the presence of a gas to maintain their size and shape. In the context of the present invention, inflatable element means inflatable objects made preferably of light material such as latex, polychloroprene, nylon fabric or other type of light materials. Example of inflatable elements are as follow: inflatable mattresses, inflatable lifejackets, inflatable boats, inflatable oil containment booms, inflatable medical equipment, but can also be other type of inflatable elements.

Valve:

A valve is a device for halting or controlling the flow of fluid through a passage, inlet, outlet, nozzle, etc. In the context of the invention, the valve allows a gas, to flow through it in only one direction, and is used to inflate and deflate an inflatable element. The valve comprises a valve housing, at least one hole extending through the valve housing and a valve inflatable part. The valve can be directly integrated in the inflatable element or fluid connected to the inflatable element.

Principles Forming the Basis of the Invention

The inventor has realized that it is possible to use the principles of fluid pressure to make a simple valve for inflating and deflating an inflatable element.

FIG. 1 shows a schematic side view of an inflatable element 110 with a valve 200 (visible on FIG. 2) according one possible embodiment of the present invention. The valve 200 comprises a valve housing 202 with a valve housing surface 204, wherein the valve housing is fluid connected in an airtight manner to inflatable element 110.

In the embodiment of FIG. 1, the valve housing 202 and inflatable element 110 are the same (202/110). In another embodiment, the valve housing 202 can be a separate housing that is fluid connected in an airtight manner to the inflatable element 110.

The valve comprises an at least one hole 206 (FIG. 1 shows three such holes 206) extending through the valve housing 202 (shown in FIG. 1 as the inflatable element 110), and a valve inflatable part 220.

The valve inflatable part 220 comprises a nozzle 222 and an inflatable flap 224. The valve inflatable flap 224 is not visible on FIG. 1 as it is located inside the inflatable element 110.

Figure 2:
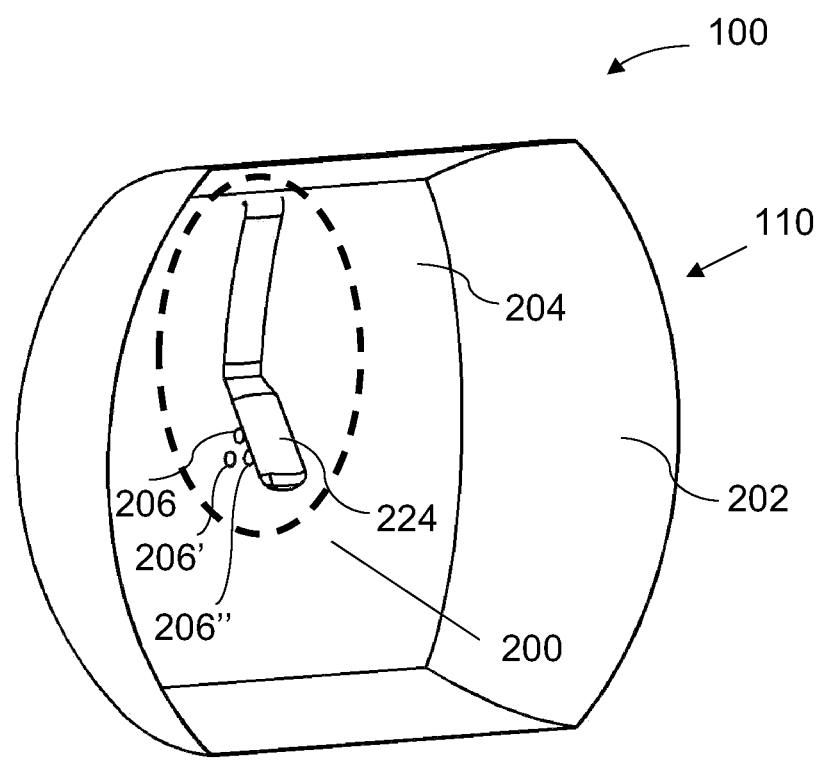
FIG. 2 shows a cross-section view of the system for inflating and deflating an inflatable element of FIG. 1 comprising a valve according to one embodiment of the present invention

FIG. 2 shows a vertical cross section view of the same inflatable element 110 as in FIG. 1. In FIG. 2 the inflatable element 110 is cut open vertically to provide a view from the inside part of the inflatable element 110 with the valve 200. The valve 200 comprises the at least one hole 206 and the valve inflatable 220 comprising the nozzle 222 (as shown on FIG. 1) and the inflatable flap 224 (as shown on FIG. 2), wherein the nozzle 222 and the inflatable flap 224 are fluid connected.

The at least one hole 206 is designed to allow a gas flow to flow in and out from the valve housing 202 for the purpose of inflating or deflating the inflatable element 110.

The valve inflatable part 220 extends through the valve housing 202 such that the nozzle 222 is disposed outside the valve housing 202 (as shown in FIG. 1) and the inflatable flap 224 is disposed next to at least hole 206 inside the valve housing 202 (as shown in FIG. 2). The valve inflatable part 220 extends through the valve housing 202 in an airtight manner to avoid gas leakages from the valve housing 202.

Figure 4:
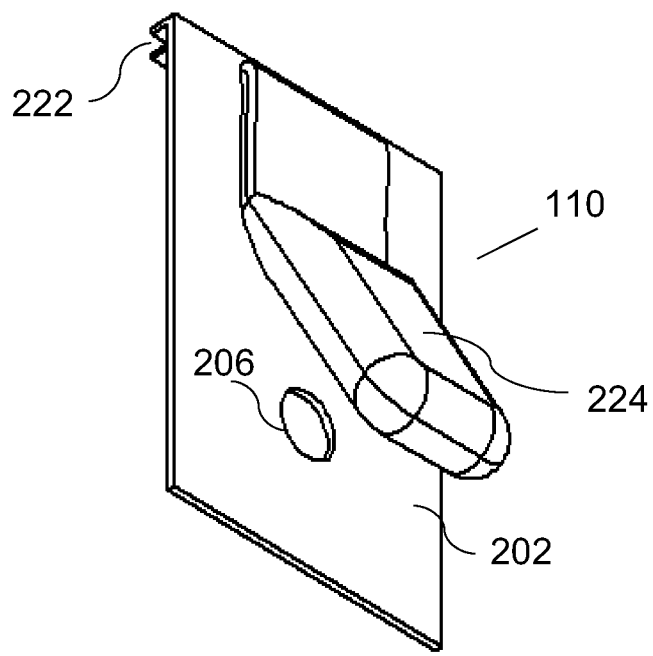
FIG. 4 shows a side view of the system according to one embodiment of the present invention, when the inflated flap is inflated.

The inflatable flap 224 is disposed next to and adapted to cover the at least one hole 206 when the inflatable flap is deflated (as illustrated in FIG. 4).

In an alternative embodiment, the inflatable flap 224 can be connected to the valve housing 202 by means of connecting the inflatable flap 224 to the valve housing 202, for example by partially gluing the inflatable flap 224 to the valve housing 202. In such an alternative embodiment, the inflatable flap 224 is connected to the valve housing 202 such that it allows a gas to flow through the at least one hole, past the inflatable flap 224 and into the inflatable element 110 when the latter is being inflated. Further, the inflatable flap 224 is connected to the valve housing 202 such that it also allows a gas to flow out from inside the inflatable element 110, past the inflatable flap 224, and release through the at least one hole 206 when the former is being deflated.

Figure 3:
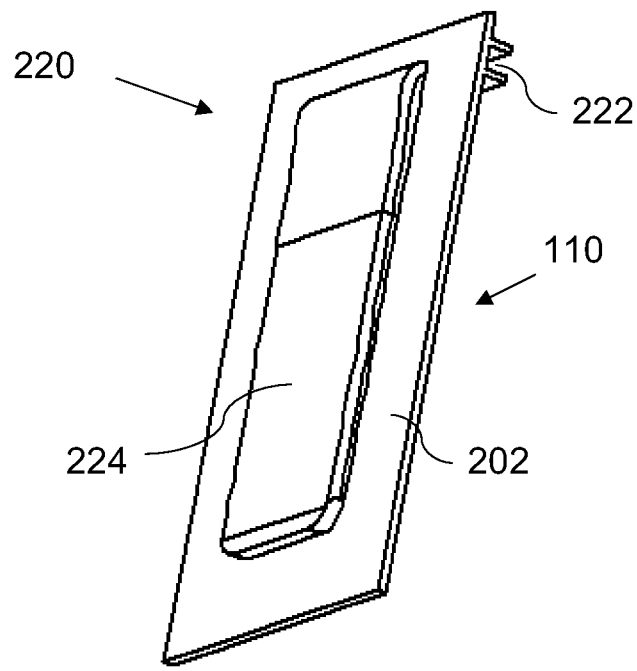
FIG. 3 shows a side view of the system according to one embodiment of the present invention, when the inflatable flap is deflated.

The inflatable flap 224 can be inflated or deflated as shown respectively in FIG. 3 and FIG. 4.

FIG. 3 shows the valve 200 with the inflatable flap 224 deflated and flat, in this state the inflatable flap behaves as a flap when the inflatable element 110 is being inflated or is in an inflated state.

FIG. 4 shows the valve with the inflatable flap 224 inflated. The inflatable flap 224 can be inflated for deflating the inflatable element. When the inflatable flap 224 is inflated, it is no longer flat, and has a curved and stiff surface such that the gas can be released past the valve 200 as shown in FIG. 4.

To inflate the inflatable flap 224, a flow of gas can be introduced through the nozzle 222 and further into the inflatable flap 224 to inflate it.

In an alternative embodiment, the inflatable flap 224 can remain in this inflated state if the nozzle 222 is closed by use of means for closing the nozzle 222.

To deflate the inflatable flap 224, the gas under pressure inside the inflatable flap 224 is released by opening the nozzle 222. The pressure inside the valve inflatable flap induces the gas to flow out from the inflatable flap 224 and further out from the nozzle 222, ultimately deflating the inflatable flap 224.

Two examples are provided below for illustrating the principles forming the basis of the invention.

Inflation Mode—Inflate the Inflatable Element 110:

To inflate the inflatable element 110, a user can dispose his mouth directly onto the at least one hole 206 of the valve housing 202 and blows air directly through the at least one hole 206 into the inflating element 110. The user can hold his mouth in an airtight manner against the at least one hole 206 to ensure an optimal inflation of the inflatable element 110. During this operation, the inflatable flap 224 is in a deflated state and behaves as a flap. Each time the user blows air through the at least one hole 206 into the inflatable element 110 the inflatable flap 224 is pushed aside allowing air to pass freely. When the inflatable flap 224 is pushed aside, it does not cover the at least one hole 206 in an airtight manner. Hence, the air blown by the user through the at least one hole 206 can flow beside the inflatable flap 224 and further into the inflatable element 110. This is achieved due to the pressure induced from the air being blown by the user, which pushes aside the inflatable flap 224 from the at least one hole 206 and make a passageway between the at least one hole 206 and the inflatable flap 224. Therefore, the air that is blown by the user can flow through the at least one hole 206 and into the inflatable element without being stopped by the inflatable flap 224. The user can keep blowing air until the inflatable element 110 is inflated at a desired state. When the desired state is achieved, the user can stop blowing air. The inflatable flap 224 instantly retracts onto and covers in an air tight manner the opening of the at least one hole 206, connecting the at least one hole 206 and the inflatable flap 224, and ultimately closing the at least one hole 206. This is achieved due to the air pressure inside the inflatable element 110 which forces the inflatable flap 224 to cover the at least one hole 206. Friction between the inflatable flap 224 and the valve housing 202, and air pressure inside the inflatable element 110, keep the connection between the inflatable flap 224 and the at least one hole 206 airtight. Hence, the inflatable element 110 can be kept at the desired inflated state.

Deflation Mode—Deflate the Inflatable Element 110:

To deflate an already inflated inflatable element 110 by using the valve 200 of the present invention, a user can dispose his mouth in an airtight manner directly onto the nozzle 222 and blow air inside the nozzle to inflate the inflatable flap 224. As the inflatable flap 224 inflates, its outer surface curves opening the at least one hole 206 to release the air from inside the inflatable element 110 through the at least one hole 206. The air from inside the inflatable element can flow out through the at least one hole 206, ultimately deflating the inflatable element 110.

Hence, in the context of the invention the valve inflatable flap 224 has three main functions. First, in the inflation mode, the inflatable flap 224 can retract from the at least one hole 206, and thereby opens the at least one hole 206 to let a gas flow into the inflatable element 110 for the purpose of inflating it. Second, in the inflation mode, the inflatable flap 224 can cover the at least one hole 206 to close the at least one hole 206 and maintain the inflatable element 110 in an inflated state. Third, in the deflation mode, the inflatable flap 224 can be inflated, as its surface curves it opens the at least one hole 206 to release gas from the inflatable element 110 through the at least one hole 206, thereby deflating the inflatable element 110.

In another aspect of the invention, the inflatable element 110 can be a plurality of inflatable element 110. In such an embodiment, each inflatable element 110 comprises the valve 200 of the present invention, as shown in FIGS. 5 and 6.

Figure 5:
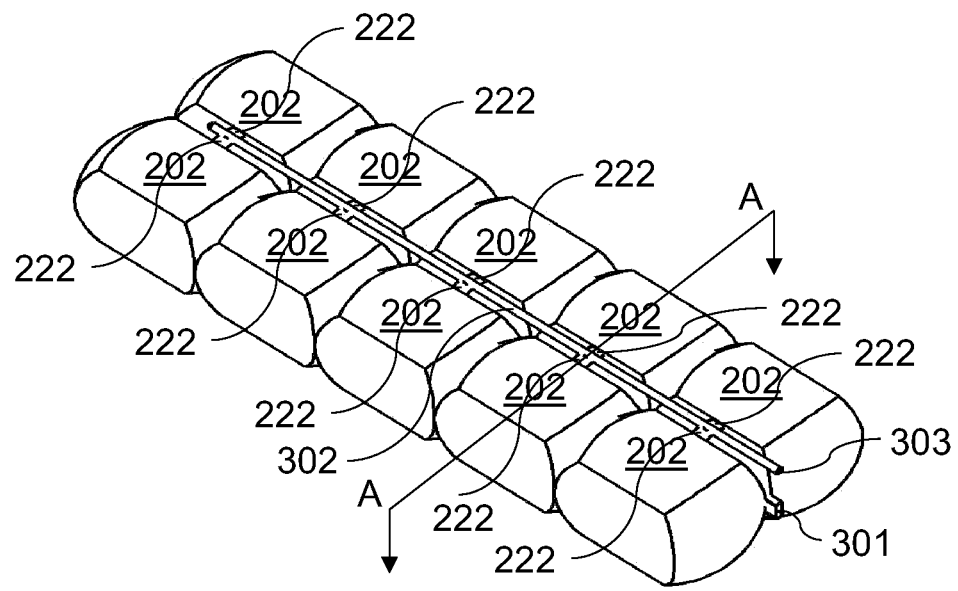
FIG. 5 shows a top view of a plurality of system for inflating an inflatable element each comprising a valve according to one embodiment of the present invention

FIG. 5 shows a top view of a plurality of system 100 for inflating an inflatable element 110 comprising a valve 200 according to one embodiment of the present invention. FIG. 6 shows a cross-section view of the plurality of system for inflating an inflatable element as in FIG. 5, comprising a valve according to one embodiment of the present invention.

Figure 6:
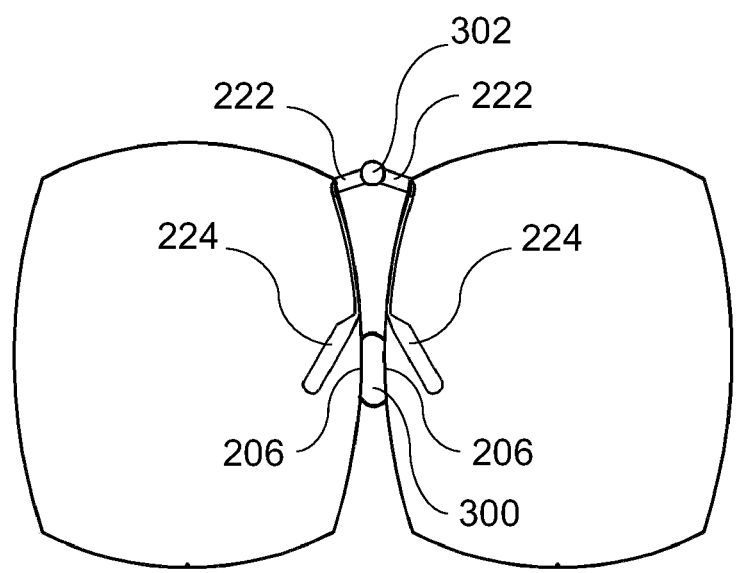
FIG. 6 shows a cross-section view of the plurality of system for inflating an inflatable element as shown in FIG. 5 comprising a valve according to one embodiment of the present invention

FIG. 5 and FIG. 6 shows that the at least one hole 206 of each inflatable elements can be fluid connected in an airtight manner, via for example a first pipe 300 (not visible on FIG. 5). The first pipe 300 is preferably not a ridged pipe but can also be other type of pipes obvious to the skilled person. Further, the first pipe 300 can have a closed end and an opened end, the open end being a main opening 301 (not visible on FIG. 6). A user can use the main opening 301 to blow air into and inflate the plurality of inflatable element 110 simultaneously. Similarly, the nozzle 222 of each inflatable element can be fluid connected in an airtight manner, via for example a second pipe 302. The second pipe 302 can have a close end and an opened end, the open end being a main nozzle 303 (not visible on FIG. 6). The user can use the main nozzle 303 to blow air into and inflate the plurality of inflatable flap 224 simultaneously, this will consequently deflate simultaneously the plurality of inflatable elements 110.

Best Modes of Carrying Out the Invention

Presently, it appears that the best mode for carrying out the invention is that the valve inflatable flap 224 is preferably made of light inflatable material that is air tight, water resistant, soft and flexible, but can also be made of other type of material. The use of such material makes it easy for a user to inflate the inflatable flap 224 and provides an airtight connection between the at least one hole 206 and the inflatable flap 224 when the inflatable element 110 is inflated.

The inflatable flap 224 is inflatable, so that it can be blown up to open the at least one hole 206. The inflatable flap 224 can have the shape of a balloon but is not limited to it and can have other shapes.

The inflatable flap 224 is preferably maintained in position next to the at least one hole 206 inside the valve housing 202 and is adapted to cover the at least one hole 206. The valve 200 comprises means for connecting the inflatable flap 224 next to the at least one hole 206 inside the valve housing 202. This may be achieved using glue, an adhesive, or other way that are obvious to the skilled person.

The valve 200 preferably does not comprise any solid/stiff elements. However, alternative embodiments of the invention may also comprise such solid, stiff or rigid elements, or a combination of these. For example, the nozzle 222 of the valve can comprise rigid, solid or stiff material, or a combination of these, to ease the use of the nozzle 222. In another embodiment of the invention, the at least one hole 206 may comprise solid, stiff or rigid elements, for example a mouthpiece, or a combination of these, to ease the use of the at least one hole 206.

The nozzle 222 preferably protrudes from and outside the valve housing 202. However, the invention is not limited to it, and the opening of the nozzle can be disposed tangentially at the surface of the valve housing 202, or inside a joint of the valve housing 202.

The nozzle 222 preferably is open, but can comprises at least one mean for closing the nozzle, such that the user can close the nozzle and does not need to hold the nozzle closed while the inflatable element 110 is deflating.

The at least one hole 206 is preferably a plurality of holes. The effect of this is that it is more effective for a user to inflate the inflatable element 110. Further, it makes the deflation more effective.

The at least one hole 206 preferably has a circular shape but can have other shapes.

The valve housing 202 is preferably made of a flexible material. However, the invention is not limited to it. The valve housing can also be made of a stiff, rigid or solid material, or a combination of these. The material used is adapted to the use of the valve.

The valve 200 is preferably an integrated part of the inflatable element 110. This means the at least one hole 206 is extending through the inflatable element 110, the valve inflatable flap 224 can be inside the inflatable element 110, and the nozzle 222 can be disposed outside the inflatable element 110.

The gas preferably used to inflate the inflatable element is air. However, other types of gases may be used for example hydrogen, helium and nitrogen or other type of gases.

The inflatable element 110 and the valve 200 are preferably designed to minimize leakage of the gas used to inflate the inflatable element 110. This may be achieved by packings, seals and the similar which is obvious to the skilled person.

The size of the valve 200, comprising the valve housing 202, the at least one hole 206 and the valve inflatable part 220, is adapted to the specific used of the valve 200.

Alternative Embodiments

A number of variations on the above can be envisaged. For example the valve of the present invention can be installed in air mattresses both for outdoor and indoor use.

In another alternative embodiment, the valve could also be useful for inflatable life vests.

In another alternative embodiment, the valve can be folded and stored in a small space without it being damaged, it could be useful in the medical field.

In another alternative embodiment, the valve could also be useful in inflatable boats, rafts and other flotation devices.

In another alternative embodiment, the valve could also be used in oil containment booms.

INDUSTRIAL APPLICABILITY

The invention according to the application finds use in inflatable elements.

The invention claimed is:

1. A valve for inflating and deflating an inflatable element wherein the valve comprises:
   a valve housing fluid connected to the inflatable element;
   an at least one hole extending through the valve housing and accommodated to let a fluid flow in and out the valve housing for inflating and deflating the inflatable element; and
   a flap disposed next to the at least one hole inside the valve housing such that the flap covers the at least one hole and behaves as a flap when inflating the inflatable element,
   characterized in that the flap is inflatable and is fluid connected with a nozzle disposed outside the valve housing,
   wherein the inflatable flap, when inflated, uncovers the at least one hole releasing a fluid flow through the at least one hole for deflating the inflatable element.

2. A valve according to claim 1, wherein the inflatable flap is comprised by a valve inflatable part together with the nozzle in a unitary body.

3. A valve according to claim 1, wherein the inflatable flap is made of fluid tight and moisture resistant material.

4. A valve according to claim 1, wherein the valve housing and the inflatable flap are provided with means for minimizing fluid leakages.

5. An inflatable element comprising a valve, wherein the valve comprises:
   a valve housing fluid connected to the inflatable element;
   an at least one hole extending through the valve housing and accommodated to let a fluid flow in and out the valve housing for inflating and deflating the inflatable element; and
   a flap disposed next to the at least one hole inside the valve housing, such that the flap covers the at least one hole and behaves as a flap when inflating the inflatable element,
   characterized in that the flap is inflatable and is fluid connected with a nozzle disposed outside the valve housing,
   wherein the inflatable flap, when inflated, uncovers the at least one hole releasing a fluid flow through the at least one hole for deflating the inflatable element.

6. An inflatable element according to claim 5, further comprising a plurality of inflatable elements each comprising a valve.

7. An inflatable element according to claim 6 wherein the inflatable flap of each valve comprised in the plurality of inflatable elements are fluid connected to accommodate a simultaneous deflation of the plurality of inflatable elements.

8. An inflatable element according to claim 6, wherein the at least one hole of each valve comprised in the plurality of inflatable elements are fluid connected to accommodate a simultaneous inflation of the plurality of inflatable elements.

* * * * *